United States Patent
Sung et al.

(10) Patent No.: US 10,193,727 B1
(45) Date of Patent: Jan. 29, 2019

(54) SELECTIVE MUTING OF TRANSMISSION OF REFERENCE SIGNALS TO REDUCE INTERFERENCE IN A WIRELESS NETWORK

(71) Applicant: Sprint Spectrum L.P., Overland Park, KS (US)

(72) Inventors: Sanghoon Sung, Ashburn, VA (US); Udit Thakore, Fairfax, VA (US); Dhaval Mehta, Aldie, VA (US); Yu Wang, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 165 days.

(21) Appl. No.: 15/375,896

(22) Filed: Dec. 12, 2016

(51) Int. Cl.
| | | |
|---|---|---|
| *H04L 27/26* | (2006.01) | |
| *H04W 72/04* | (2009.01) | |
| *H04L 5/00* | (2006.01) | |
| *H04W 88/02* | (2009.01) | |
| *H04W 88/08* | (2009.01) | |

(52) U.S. Cl.
CPC .......... *H04L 27/261* (2013.01); *H04L 5/0007* (2013.01); *H04W 72/042* (2013.01); *H04W 88/02* (2013.01); *H04W 88/08* (2013.01)

(58) Field of Classification Search
CPC .. H04L 27/261; H04L 5/0007; H04W 72/042; H04W 88/08; H04W 88/02
See application file for complete search history.

(56) References Cited

U.S. PATENT DOCUMENTS

| | | | | |
|---|---|---|---|---|
| 2012/0294250 A1* | 11/2012 | Pan | ................... | H04W 72/0453 370/329 |
| 2014/0256336 A1* | 9/2014 | Manssour | ............. | H04L 1/0026 455/450 |
| 2015/0270918 A1* | 9/2015 | Lee | ..................... | H04L 27/0012 370/329 |
| 2016/0294526 A1* | 10/2016 | Kim | ..................... | H04J 11/0056 |

\* cited by examiner

*Primary Examiner* — Tejis Daya

(57) ABSTRACT

Disclosed is a method and system for selectively muting default downlink transmission of particular reference signals in order to reduce interference experienced by user equipment devices (UEs) receiving user data. In scheduling transmission of a downlink resource block (RB), a base station may select a particular transmission mode (TM) that does not require transmission of the particular reference signal. The base station may also determine that no condition exists that requires default transmission of the particular reference signal during a time interval allocated for transmission of the RB and on sub-carrier frequencies allocated to the RB. With particular TM selected and the absence of other requirements for default transmission of the particular reference signal, the base station can then mute transmission of the particular reference signal during transmission of the downlink RB. The base station may also coordinate scheduling with a neighboring base station to achieve further interference reduction.

20 Claims, 10 Drawing Sheets

SELECTIVE MUTING OF TRANSMISSION OF REFERENCE SIGNALS TO REDUCE INTERFERENCE IN A WIRELESS NETWORK

BACKGROUND

A typical cellular wireless network includes a number of base stations each radiating to define a respective coverage area, such as a "cell" or "sector" (e.g., a subdivision of a cell), in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Depending on the specific underlying technologies and architecture of a given wireless communication network, base stations may take different forms. In a code division multiple access (CDMA) system configured to operate according IS-2000 and IS-856 standards, for example, a base station may include a base transceiver system (BTS) under the control of a base station controller (BSC). In a universal mobile telecommunications system (UMTS) configured to operate according to ITU IMT-2000 standards, the base station is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other base station architectures and operational configurations are possible as well.

Further, a wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE), LTE Advanced and Wireless Interoperability for Microwave Access (WiMAX)), Code Division Multiple Access (CDMA) (e.g., 1×RTT and 1×EV-DO), and Global System for Mobile Communications (GSM), and wireless local area network (WLAN) protocols such as IEEE 802.11 (WIFI), BLUETOOTH, and others. Each protocol may define its own procedures for registration of UEs, initiation of communications, handover or handoff between coverage areas, and other functions related to air interface communication.

In practice, a base station, such as an eNodeB, may be configured to provide service to UEs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served UEs. For instance, on the downlink, a carrier may define a reference channel on which the base station broadcasts a reference signal useable by UEs to detect and evaluate coverage, various other downlink control channels to carry control signaling (such as resource-scheduling directives) to UEs, and one or more shared or traffic channels for carrying bearer data (e.g., user or application level data) to UEs. And on the uplink, a carrier may define one or more uplink control channels to carry control signaling (such as resource scheduling requests, channel state reports, and the like) from UEs, and one or more shared or traffic channels for carrying bearer data from UEs. In practice, the shared or traffic channels may define particular physical resources for carrying data between the base station and UEs.

When a UE enters into a cell or sector (or more generally, coverage area) of a base station, the UE may attach, register, or otherwise associate with the base station, and the base station may then serve the UE on one or more carriers. The base station may then be referred to as the UE's "serving" base station. Herein, the term "serving" will, in general, be used to describe a particular base station as such only when it is not otherwise apparent from context. In practice, the process of serving the UE may involve the serving base station allocating use of particular air interface resources, such as traffic channels or portions thereof, to carry data communications to and from the UE, and managing transmission on those resources, such as controlling what modulation scheme is used for the transmissions.

For instance, when the serving base station has data to transmit to the UE, the serving base station may select certain downlink resources to carry the data and may determine a modulation scheme for transmission on those resources, and the base station may then (i) transmit to the UE a scheduling directive instructing the UE to receive the data on the scheduled resources using the determined modulation scheme, and (ii) transmit the data on the indicated downlink resources using the determined modulation scheme. Likewise, when the serving base station receives from the UE a request for the UE to transmit data to the base station, the base station may select certain uplink resources to carry the data and may determine a modulation scheme for transmission on those resources, and the base station may then (i) transmit to the UE a scheduling directive instructing the UE to transmit the data on the scheduled resources using the determined modulation scheme and (ii) receive the transmission from the UE accordingly.

A UE may also move between neighboring coverage areas of base stations. More specifically, as a UE moves between wireless coverage areas of a wireless communication system, or when network conditions change or for other reasons, the UE may "handover" (or "hand off") from operating in one coverage area (e.g., a serving coverage area) to operating in another coverage area. In a usual case, this handover process is triggered by the UE monitoring the signal strength of various nearby available coverage areas, and the serving base station (or some other controlling network entity) determining when one or more threshold criteria are met. For instance, a UE may continuously monitor signal strength from various available coverage areas and notify its serving base station when a given coverage area has a signal strength that is sufficiently higher than that of the serving base station. The serving base station (or some other controlling network entity) may then direct the UE to handover to the base station of the given coverage area. By convention, a UE is said to handover from a "source" base station (or source coverage area) to a "target" base station (or target coverage area). At the time that a handover is triggered, the source base station is the UE's serving base station.

Overview

Communications from a base station to a UE are carried on a "forward link" (e.g., in a CDMA system) or "downlink" (e.g., in a UMTS/LTE network) of an air interface between the UE and base station, and communications from a UE to the base station are carried on "reverse link" (e.g., in a CDMA system) or "uplink" (e.g., in a UMTS/LTE network) of the air interface. By way of example, the discussion herein will be made with reference to LTE, and the terms downlink and uplink will therefore be adopted. However, it should be understood that discussion applies as well to forward and reverse links.

In practice, the downlink and uplink are both configured for carrying various types of data and signals. These can include control and signaling indications for scheduling and managing communication between base stations and UEs, user data, and system messages, among others. Control and signaling indications are usually transmitted using preconfigured or reserved air interface resources to ensure reliability and ready recognition by intended recipients; other types of data, such as user data, may be more opportunistically scheduled. One particular category of signals is reference signals, which may typically use relatively spare resources in time and/or frequency, but at the same time carry fundamental identifying information and calibrations for level-setting operations. For example, base stations may transmit identifying beacons and timing information used by UEs to acquire air interface access and synchronization.

By way of example, LTE specifies, among other reference signals, a "Cell Specific Reference Signal" ("CRS") the UEs can detect for searching and acquiring base stations, measuring downlink quality, and estimating downlink channels for coherent demodulation and detection of downlink signals. As described below, LTE transmissions are scheduled and carried in units of "Resource Blocks" ("RBs"), each of which includes an array of "Resource Elements" ("REs") that span a sequence of symbol encoding times in repeating sub-frames of repeating frames and a distinct sequence of sub-carrier frequencies of a carrier band. The CRS is allocated specific REs in each RB, and in conventional LTE operation, the CRS is transmitted on each allocated RE in every downlink RB during every sub-frame.

The specific REs allocated to the CRS in each RB—usually eight—form a pattern within the array of REs of each RB, with fixed offsets of REs in time and sub-carrier frequency. While the offset pattern is typically the same across a wireless network, the pattern used by neighboring base stations on their respective downlinks may be shifted up or down relative to each other by one sub-carrier frequency to avoid interference that would otherwise occur from the CRS being transmitted on the same sub-carrier frequency at the same time. As a result, the REs carrying a CRS in downlink RBs transmitted from one base station may interfere with REs carrying user data in downlink RBs transmitted from a neighboring base station. When this happens, achievable downlink user data rates may be diminished, and overall performance can suffer.

Because the CRS is needed to ensure reliable and robust system operation, it is transmitted in every downlink RB (according to the RE pattern) in the carrier band and in every sub-frame. However, there can be geographic locations and/or times of day when this degree pervasive transmission is not required. Further, there are modes of downlink transmission relating to antenna configurations in which transmission of the CRS is not strictly necessary, and there can be other operational conditions in which CRS transmission is not required. In conventional operation under LTE, situations in which CRS transmission can be omitted are not considered: the CRS is always transmitted. Yet such situations represent opportunities for reducing downlink interference. It would therefore be desirable to monitor for these situations, and mute or omit CRS transmissions when it can be determined that it is that it is safe and/or feasible to do so.

Accordingly, disclosed herein are example systems and methods for selectively muting CRS transmission on an opportunistic basis in order to reduce downlink interference experienced by UEs receiving user data. In muting or omitting CRS transmission, a base station may further communicate with one or more neighboring base stations in order to coordinate muting of CRS transmission so as to optimize opportunities for interference reduction among all the base stations in a common region or area. More generally, the techniques described by way of example in the context of LTE can be extended to apply to any downlink reference signal that can cause interference, and that can be omitted from default transmission under appropriate circumstances.

Hence, in one respect, various embodiments of the present invention provide a method operable in a wireless communication network including a first base station configured for serving user equipment devices (UEs) within a first coverage area of the first base station, the method comprising: for a given transmission time interval (TTI) during which a plurality of downlink resource blocks (RBs) are scheduled to be transmitted to one or more UEs being served by the first base station, making a selection for a first subset of RBs of the plurality of a particular transmission mode (TM) for which a particular type of downlink reference signal is not required to be transmitted, wherein each of the scheduled RBs of the plurality is allocated one of a plurality of distinct groups of sub-carrier frequencies of a carrier band during the given TTI, and the particular type of downlink reference signal is scheduled to be transmitted on respective specific sub-carriers of all RBs of the plurality by default; making a determination that for a second subset of RBs of the plurality, no condition exists that requires transmission of the particular type of downlink reference signal; determining a third subset of RBs of the plurality as a combinatory intersection of the first and second subsets; and muting transmission of the particular type of downlink reference signal on any of the sub-carriers of any of the third subset of RBs of the plurality during transmission in the TTI by the first base station of the plurality of downlink RBs, including the third subset.

In another respect, various embodiments of the present invention provide a wireless communication network comprising: a first base station configured for serving user equipment devices (UEs) within a first coverage area of the first base station; one or more processors configured as part of at least in the first base station; and memory accessible to the one or more processors, and storing machine language instructions that, upon execution by the one or more processors, cause the wireless communication network to carry out operations including: for a given transmission time interval (TTI) during which a plurality of downlink resource blocks (RBs) are scheduled to be transmitted to one or more UEs being served by the first base station, making a selection for a first subset of RBs of the plurality of a particular transmission mode (TM) for which a particular type of downlink reference signal is not required to be transmitted, wherein each of the scheduled RBs of the plurality is allocated one of a plurality of distinct groups of sub-carrier frequencies of a carrier band during the given TTI, and the particular type of downlink reference signal is scheduled to be transmitted on respective specific sub-carriers of all RBs of the plurality by default; making a determination that for a second subset of RBs of the plurality, no condition exists that requires transmission of the particular type of downlink reference signal; determining a third subset of RBs of the plurality as a combinatory intersection of the first and second subsets; and muting transmission of the particular type of downlink reference signal on any of the sub-carriers of any of the third subset of RBs of the plurality during transmission in the TTI by the first base station of the plurality of downlink RBs, including the third subset.

Further, in still another respect, various embodiments of the present invention provide a wireless communication network comprising: a first base station configured for serving user equipment devices (UEs) within a first coverage area of the first base station by, at least, scheduling and transmitting downlink resource blocks (RBs) arrayed over repeating sequences of sub-frames of repeating frames in time and over contiguous groupings of sub-carrier frequencies of a carrier band, wherein specific time-frequency elements (TFEs) of each downlink RB from the first base station are allocated for default transmission of a particular downlink reference signal; a second base station configured for serving UEs within a second coverage area of the second base station by, at least, scheduling and transmitting downlink RBs arrayed over the repeating sequences of sub-frames of the repeating frames in time and over the contiguous groupings of sub-carrier frequencies of the carrier band, wherein specific TFEs of each downlink RB from the second base station are allocated for default transmission of the particular downlink reference signal, wherein the first and second coverage areas neighbor each other; one or more processors distributed among at least in the first and second base stations; and memory accessible to the one or more processors, and storing machine language instructions that, upon execution by the one or more processors, cause the wireless communication network to carry out operations including: for a given sub-frame, coordinating at the first and second base stations scheduling of transmission of (i) at least one downlink RB from the first base station to at least one UE that is reporting to the first base station a signal to interference plus noise ratio (SINR) below a threshold SINR, and (ii) at least one downlink RB from the second base station to at least one UE that is reporting to the second base station a SINR below the threshold SINR; for both the scheduled at least one downlink RB from the first base station and the scheduled at least one downlink RB from the second base station, selecting a particular transmission mode (TM) for which the particular type of downlink reference signal is not required to be transmitted; for both the scheduled at least one downlink RB from the first base station and the scheduled at least one downlink RB from the second base station, making a determination that no condition exists that requires transmission of the particular type of downlink reference signal; and during synchronous transmission in the given sub-frame of both the scheduled at least one downlink RB from the first base station and the scheduled at least one downlink RB from the second base station, muting transmission of the particular type of downlink reference signal in any of the TFEs of the at least one downlink RB from the first base station and any of the TFEs of the at least one downlink RB from the second base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
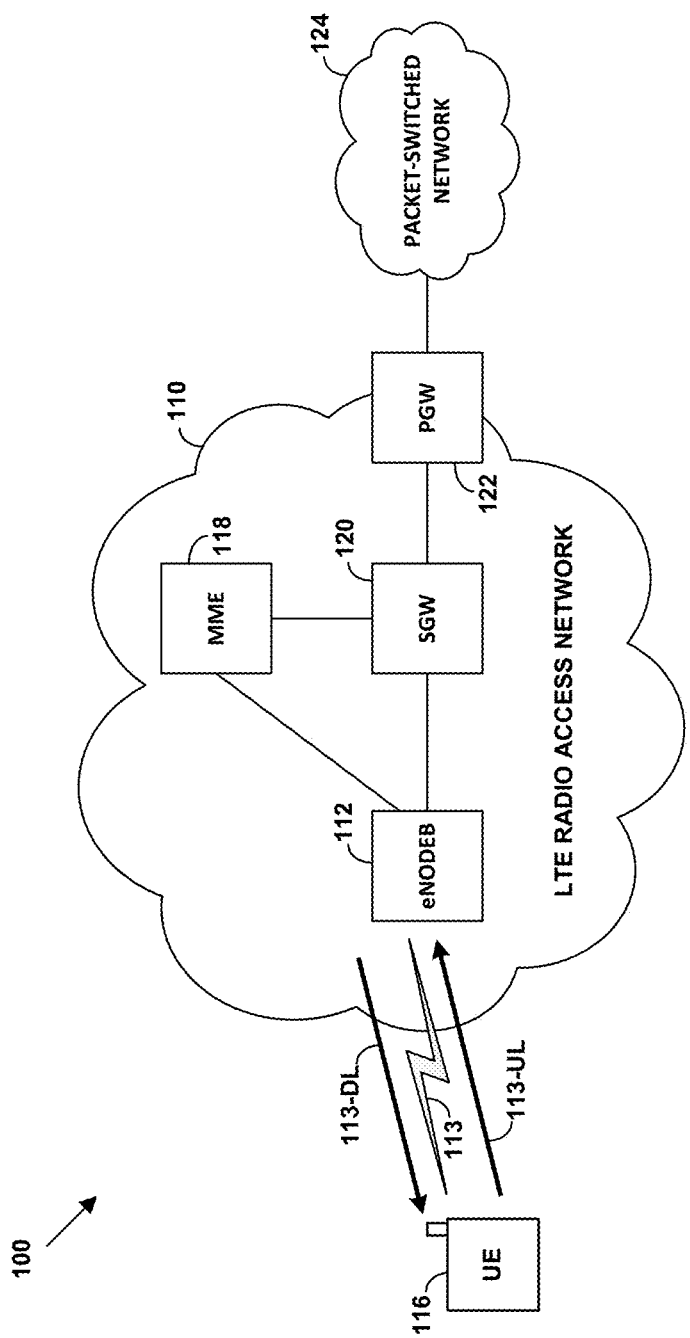
FIG. 1 is a simplified block diagram of a wireless communication network in which an example method can be implemented, in accordance with example embodiments.

Referring to the drawings, FIG. 1 is a simplified block diagram of a wireless communication system or network 100 in which an example of the present method can be implemented. In particular, FIG. 1 includes by way of example a representative LTE radio access network (RAN) 110 including an example LTE base station known as an eNodeB 112, which radiates to provide a wireless coverage area defining an LTE air interface 113 through which the eNodeB may serve one or more UEs. As shown, the air interface 113 supports downlink communications from the eNodeB 112 to the UE 116 on an air interface downlink 113-DL, and supports uplink communications from the UE 116 to the eNodeB 112 on an air interface uplink 113-UL.

The eNodeB 112 is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Shown within coverage of the eNodeB 112 is then a representative UE 116. In practice, the LTE access network may be operated by a cellular wireless service provider, and the UE may subscribe to service of that provider.

In general, a wireless service provider may operate one or more RANs, such as the LTE RAN 110, as a "public land mobile network" ("PLMN") for serving UEs (or other mobile terminals) that subscribe to service of the provider. For example, a service provider may operate an LTE RAN as an LTE PLMN and may provide UEs with subscriptions that allow the terminals to receive LTE service from that PLMN. As another example, a service provider may operate a CDMA RAN as a CDMA PLMN and may provide UEs with subscriptions that allow the terminals to receive CDMA service from that PLMN. And as another example, a service provider may operate both an LTE PLMN and a CDMA PLMN and may provide UEs with subscriptions that allow the UEs to receive both LTE service from the LTE PLMN and CDMA service from the CDMA PLMN.

In practice, a RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

A wireless service provider may also allow one or more of its PLMNs to serve UEs that subscribe to service of other PLMNs, pursuant to a roaming agreement. In particular, a first wireless service provider providing a first PLMN may enter into a roaming agreement with a second wireless service provider providing a second PLMN, according to which the first PLMN will serve UEs that subscribe to the second PLMN, and the second wireless service provider will compensate the first service provider for providing that service. As such, a given UE that subscribes to service of the second PLMN but that is not within sufficient coverage of the second PLMN may instead opt to be served by the first PLMN, in which case the given UE is said to be "roaming" in the first PLMN. The second wireless service provider may also provide reciprocal roaming service to UEs that subscribe to service of the first PLMN.

Under LTE, each coverage area of a base station, such as the eNodeB 112, may operate on one or more RF carriers (or carrier bands) of electromagnetic spectrum. More specifically, carrier bands are allocated to service providers in different RF ranges and in non-overlapping bands of 1.4 MHz, 3 MHz, 5 MHz, 10 MHz, 15 MHz, and/or 20 MHz. Some service providers may have more than one carrier band allocation. Contiguous groupings of carriers can be further organized in frequency within different specified "band channels" used to sub-divide the RF spectrum at a higher level than individual carrier bands.

Any given carrier (or carrier band) can be characterized by a minimum frequency and a maximum frequency, such that the carrier bandwidth is just the difference between the maximum and minimum frequencies. The maximum and minimum frequencies can also be considered as defining band "edges." The carrier bandwidth is sub-divided into K "sub-carriers," each 15 kHz wide, and sub-carriers are arranged in contiguous, non-overlapping groupings of 12 each to make up a frequency dimension of N 180-kHz-wide "resource blocks" of the carrier band, as described in more detail below. The number N depends on the carrier bandwidth. In practice, the total bandwidth of any given LTE carrier is somewhat wider than the N×180 kHz of its N resource blocks. For example, a 20 MHz carrier band has N=100 resource blocks for a total utilized bandwidth of 18 MHz out of the 20 MHz available. As another example, a 10 MHz carrier band has N=50 resource blocks for a total utilized bandwidth of 9 MHz out of the 10 MHz available. Under LTE, the unutilized bandwidth—i.e., bandwidth of sub-carriers that are not included in any of the N resource blocks—is configured in two guard bands, one at each band edge. That is, one guard band occupies spectrum between the first resource block and a first band edge, and the other guard band occupies spectrum between the last resource block and the second band edge.

On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

Under LTE, downlink and uplink air interface resources are mapped in the time domain and in the frequency domain. In the time domain, the air interface may be divided into a continuum of 10 millisecond (ms) frames, with each frame being further divided into ten 1-ms sub-frames that are in turn each divided into two 0.5-ms slots. Thus, each frame has 10 sub-frames, and each sub-frame has 2 slots; the 1-ms duration of a sub-frame also defines a "transmission time interval" (TTI). Slots are each further sub-divided into a number (typically 7) of modulation intervals, or "symbol times." In the frequency domain, data for transmission during each symbol time are jointly modulated over a sequence of the K sub-carriers that span the bandwidth of the carrier, using orthogonal frequency division multiplexing (OFDM) to form one OFDM symbol per symbol time. Each OFDM symbol thus corresponds to a frequency superposition of modulated data symbols, which are further organized in frequency into groups, each group spanning 12 contiguous sub-carriers. As noted, each sub-carrier is 15 kHz wide, so each group of 12 sub-carriers occupies a 180 kHz bandwidth.

The term "symbol" herein may be used to refer to different types of entities, depending on how the term is modified, the context in which it used, or both. To help maintain clarity in the discussion, the following definitions are provided. The term "modulated data symbol" refers to data presented for transmission and/or recovered by processing following reception. An example is 6 bits modulated according to 64QAM and presented to an OFDM transmitter. The term "OFDM symbol" refers to a transmitted or received unit of data that is made up of a frequency superposition of multiple modulated data symbols, as described above. The term "data symbol" without any modifier generally refers herein to a unit of data that is transmitted across and/or received on one or more sub-carrier frequencies. As such an "OFDM symbol" may be considered a specific type or case of "data symbol."

LTE further defines a particular grouping of resources arrayed across one sub-frame (1 ms) in the time-domain and 12 sub-carriers in the frequency-domain as a resource block, as noted above. Typically, the 1-ms duration of a resource block contains 14 symbol times accommodating 14 OFDM symbols, each a frequency superposition of modulated data symbols spanning 66.7 microseconds (µs) plus a 4.69 µs guard band (cyclic prefix) added to help avoid inter-symbol interference. In practice, the cyclic prefix is commonly considered part of an OFDM symbol, so that the term "OFDM symbol" is taken to refer to the jointly-modulated data symbols plus the pre-pended cyclic prefix. Thus, each resource block contains 14 OFDM symbols by 12 sub-carriers, thereby constituting an array of 168 "resource elements." The air interface may thus support transmission of N resource blocks in each sub-frame. For instance, a 5 MHz carrier supports N=25 resource blocks in each 1-ms sub-frame, whereas a 20 MHz carrier supports N=100 resource blocks in each 1-ms sub-frame. Note that a resource block is sometimes alternatively defined as 7 OFDM symbols of a 0.5 ms slot by 12 sub-carriers in the frequency-domain. Unless stated otherwise, however, a resource block will be taken herein to be 14 OFDM symbols in the time domain (a 1-ms sub-frame).

A resource element is to the smallest unit of resource allocated on the LTE air interface. Each resource element corresponds to one modulated data symbol on one sub-carrier during one symbol time. As noted, a resource block that consists of 12 sub-carriers and 14 OFDM symbols has 168 resource elements. Each modulated data symbol, and thus each resource element, can represent a number of bits, with the number of bits depending on the modulation scheme used. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits. The frequency superposition of all modulation symbols during a given symbol time and across all sub-carriers of a given carrier band (plus a cyclic prefix) thus corresponds to one OFDM symbol.

On transmission, during each TTI (1-ms sub-frame), the N resource blocks of a carrier band are transmitted synchronously as a time sequence of 14 OFDM symbols, each spanning all the sub-carriers of the carrier band. Unused resources—e.g., resource elements and/or resource blocks for which there are no data to transmit, and/or sub-carriers in the guard bands at the carrier edges—may be included "virtually" in the frequency superposition at zero power. The frequency superposition of modulated data symbols is computed as a Fourier superposition. For purposes of the discussion herein, the Fourier superposition may be considered a form of encoding.

In practice, the computation is carried out using well-known fast Fourier transform (FFT) techniques implemented as machine language instructions (e.g., software, firmware, and/or hardware instructions) stored in one or another form of memory and executed by one or more processors. For transmission, an inverse FFT (IFFT) is applied synchronously to all modulated data symbols to be transmitted during each OFDM symbol time, thereby effectively encoding them simultaneously. The process is repeated continuously for each of the modulated data symbols in each subsequent OFDM symbol time. Every sequence of 14 OFDM symbols, time-aligned within a TTI and transmitted on the K sub-carriers of a carrier band, corresponds to N transmitted resource blocks over the TTI duration.

On reception, the N resource blocks are received during each TTI as a time sequence of the 14 transmitted OFDM symbols. An FFT is applied synchronously to each OFDM symbol as it is received in order to decompose the frequency superposition and to recover the modulated data symbols. For purposes of the discussion herein, the Fourier decomposition may be considered a form of decoding. The modulated data symbols of all N resource blocks are thereby recovered, and individual resource blocks can be obtained according to the respective 12-sub-carrier groupings that define the frequency dimensions of each resource block. If the receiver is a UE, after decoding, it will only be able to obtain those resource blocks allocated to it on the downlink.

Within a resource block, different resource elements can serve different functions. For instance, on the downlink, certain resource elements across the bandwidth may be reserved to define the PDCCH for carrying control signals such as page messages and resource allocations from the eNodeB to UEs, and other resource elements may be reserved to define the PDSCH that the eNodeB can allocate to carry transmissions to particular UEs on an as-needed basis. Likewise, on the uplink, certain resource elements across the bandwidth may be reserved to define the PUCCH for carrying control signals such as scheduling requests from UEs to the eNodeB, and other resource elements may be reserved to define the PUSCH that the eNodeB can allocate to carry transmissions from particular UEs on an as-needed basis.

In practice, the PUCCH may define various periodically occurring "scheduling request opportunities" in which a UE, such as UE 116, may transmit scheduling requests to an eNodeB, such as the eNodeB 112. For instance, each scheduling request opportunity for the UE may be a particular resource element on the PUCCH, occurring every fourth transmission TTI (i.e., every 4 ms) or the like. Optimally, the eNodeB would signal to the UE to inform the UE which scheduling request opportunities are for the UE. Thus, the UE can transmit a scheduling request to the eNodeB by simply transmitting a 1-bit or other predefined bit in one of its scheduling opportunities, and the eNodeB may thus monitor the PUCCH for such a scheduling request from the UE.

Upon receipt of scheduling request from the UE, the eNodeB may then schedule uplink transmission by the UE. In particular, the eNodeB may generate and transmit to the UE on the PDCCH "downlink control information" (DCI) that specifies scheduling information in a manner sufficient to inform the UE what resources on the PUSCH the UE should use for transmitting data to the eNodeB. For instance, the DCI may designate particular resource blocks in which the UE may transmit on the PUSCH. In practice, this allocation may be for a TTI that is some predefined time period after the TTI in which the UE sent the scheduling request, such as a TTI that is 4 milliseconds later. Thus, if the UE sends a scheduling request in a particular TTI, then the resource allocation that the UE receives in response to that request may be for resources in a TTI that occurs 4 milliseconds later.

Figure 2A:
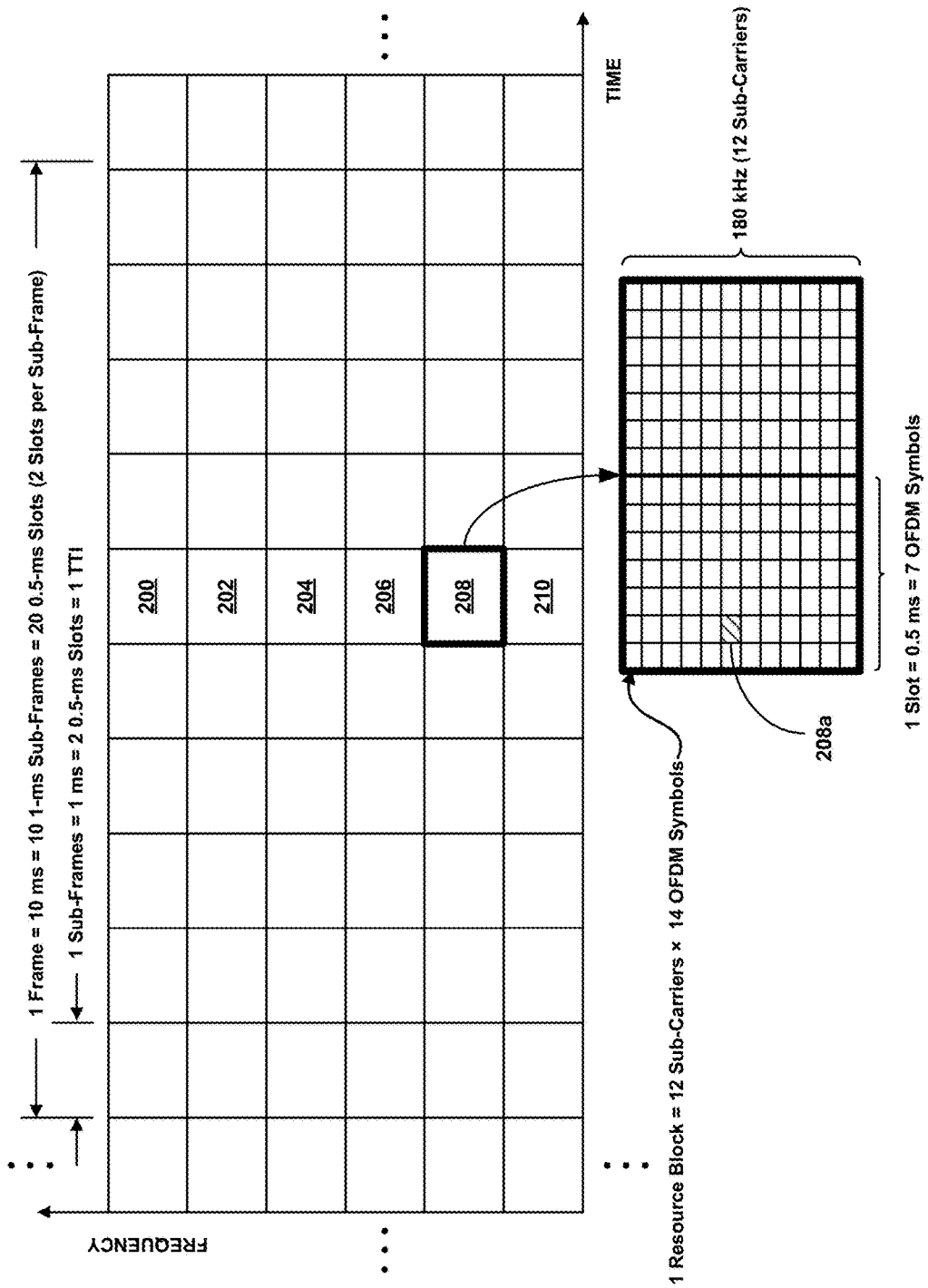
FIG. 2A is a conceptual illustration of a division of a shared communication link into resource blocks, in accordance with example embodiments.

FIG. 2A illustrates how the resources in a given wireless coverage area may be divided in time and frequency domains into resource blocks under LTE. In the time domain, each resource block occupies a 1-ms sub-frame. By way of example, FIG. 2A shows resource blocks 200-210 for a portion of a sub-frame. In the frequency domain, each of the resource blocks 200-210 occupies a respective portion of frequency bandwidth, typically 180 kHz. For purposes of illustration, FIG. 2A shows resource blocks across just six sub-frames in time and six 12-sub-carrier groupings in frequency. However, as noted above, each LTE frame typically has 10 sub-frames, while the number of resource blocks spanning frequency depends on the bandwidth of the carrier. For instance, in a 5 MHz LTE carrier, a total of 25 resource blocks may span frequency during each 1 ms sub-frame. Horizontal and vertical ellipses in the figure represent additional resource blocks in the time and frequency dimensions.

FIG. 2A also includes a more detailed view of resource block 208, illustrating resource elements arrayed in time and frequency. This detailed view shows that the 180 kHz of frequency bandwidth corresponds to 12 sub-carriers of 15 kHz each, and also shows that the 1 ms sub-frame corresponds to the duration of 14 OFDM symbols (although a different number of OFDM symbols per resource block can be used). As noted above, each resource element corresponds to a modulated sub-carrier symbol that is carried on a particular sub-carrier for the duration of one symbol time.

Figure 2B:
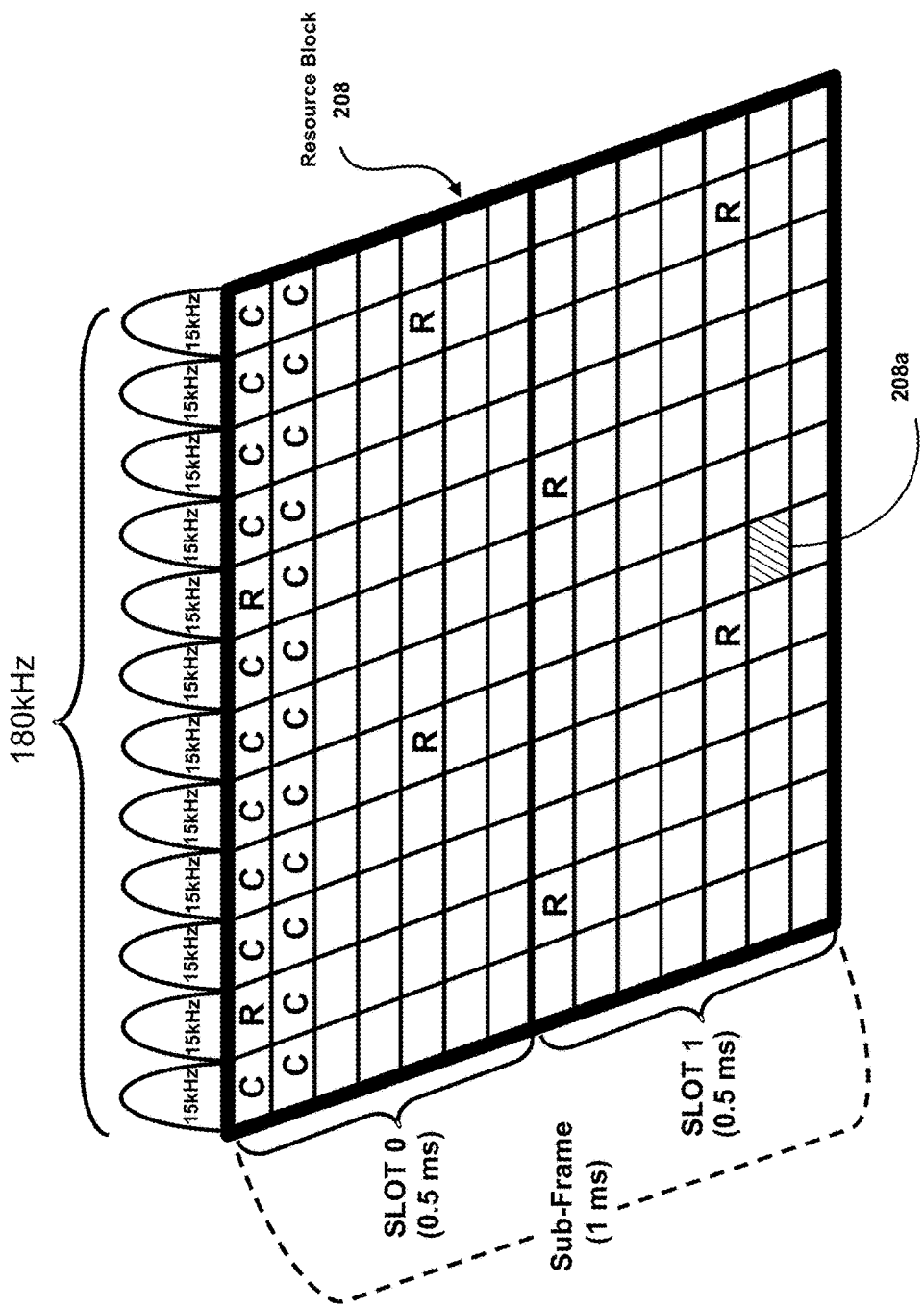
FIG. 2B is a conceptual illustration of a resource block, in accordance with example embodiments.

The use of different resource elements for different purpose is illustrated by way of example for a downlink resource block in FIG. 2B. In this example, 8 of the resource elements are labeled "R" to indicate that they are reserved for reference signals used for channel estimation. The reservation of particular REs for reference signals is described below in more detail. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a resource block could have other configurations as well.

In LTE as currently defined, a physical control format indicator channel (PCFICH) carries signaling overhead information such as an indication of how many 67 μs time segments are being used for control signaling. Additionally, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and a base station may allocate particular CCEs to particular UEs by specifying the allocations in the PCFICH, with reference to CCE IDs and UE IDs.

Figure 3:
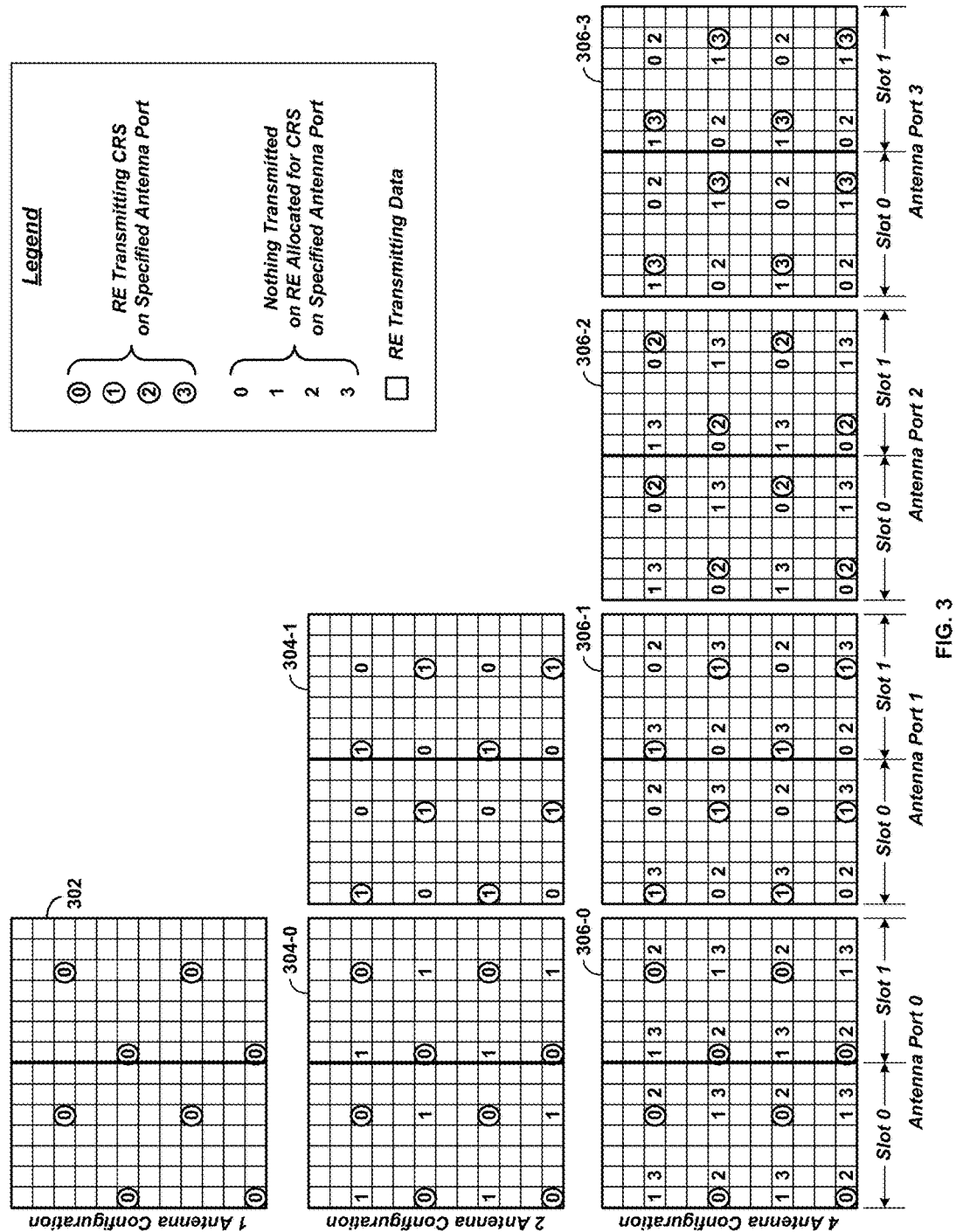
FIG. 3 is an illustration of example configurations of resource elements within resource blocks for carrying downlink reference signals, in accordance with example embodiments.

FIG. 3 is an illustration of example configurations of resource elements within resource blocks for carrying downlink reference signals, in accordance with example embodiments. Specifically, FIG. 3 shows example patterns of REs allocated for CRS transmission within the RE array of each downlink RB, for three different antenna configurations of an example eNodeB, namely 1-, 2-, and 4-antenna configurations. The vertical axis of each configuration represents a sub-carrier frequency grouping of one RB, and the horizontal axis represents 14 symbol times, with time increasing toward the right of the figure.

The RBs shown in each example represent scheduling and transmission during a single given sub-frame containing two slots, labeled "Slot 0" and "Slot 1" at the bottom of the figure. The top panel of FIG. 3 shows an example downlink RB 302 for a 1-antenna configuration of an eNodeB. The middle panel of FIG. 3 shows two example downlink RBs 304-0 and 304-1 for a 2-antenna configuration of an eNodeB. Although the two RBs 304-0 and 304-1 are shown side-by-side for purposes of illustration, they are both scheduled for simultaneous transmission during the same sub-frame, but on two different antenna ports, labeled "Antenna Port 0" and "Antenna Port 1," respectively, at the bottom of the figure. The bottom panel of FIG. 3 shows four example downlink RBs 306-0, 306-1, 306-2, and 306-3 for a 4-antenna configuration of an eNodeB. Although the four RBs 306-0, 306-1, 306-2, and 306-3 are shown side-by-side for purposes of illustration, all four are scheduled for simultaneous transmission during the same sub-frame, but on four different antenna ports, labeled "Antenna Port 0," "Antenna Port 1," "Antenna Port 2," and "Antenna Port 3," respectively, at the bottom of the figure.

In each illustrated downlink RB, a number in a circle marks a RE reserved for CRS transmission, where the number signifies the antenna port on which the CRS will be transmitted. For the single antenna port configuration, only Port 0 is shown. For the 2- and 4-antenna port configurations, the REs allocated for all ports are marked with the corresponding port number, but only the circled number represents an actual CRS transmission during the sub-frame. For example, in the RB 304-0, the circled "0" signifies the REs on which a CRS will be transmitted on antenna port 0; the REs in RB 304-0 marked with the number "1" indicate allocation of REs for CRS transmission, but the transmission is only made on antenna port 1. Conversely, in the RB 304-1, the circled "1" signifies the REs on which a CRS will be transmitted on antenna port 1; the REs in RB 304-1 marked with the number "0" indicate allocation of the REs for CRS transmission, but the transmission is only made on antenna port 0. REs that are blank represent REs available or allocated for other data transmission, such as user data.

A similar explanation applies to the 4-antenna port configuration. Namely, REs marked with circled "0" in RB 306-0 represent transmission of a CRS on antenna port 0; the numbers "1," "2," and "3" in RB 306-0 mark REs allocated for CRS transmissions that are made on antenna ports 1, 2, and 3, respectively. This explanation can be repeated for the circled and un-circled numbers in RBs 306-1, 306-2, and 306-3. Again, REs that are blank represent REs available or allocated for other data transmission, such as user data. A Legend on the upper right side of FIG. 3 summarizes the above explanation.

Figure 4:
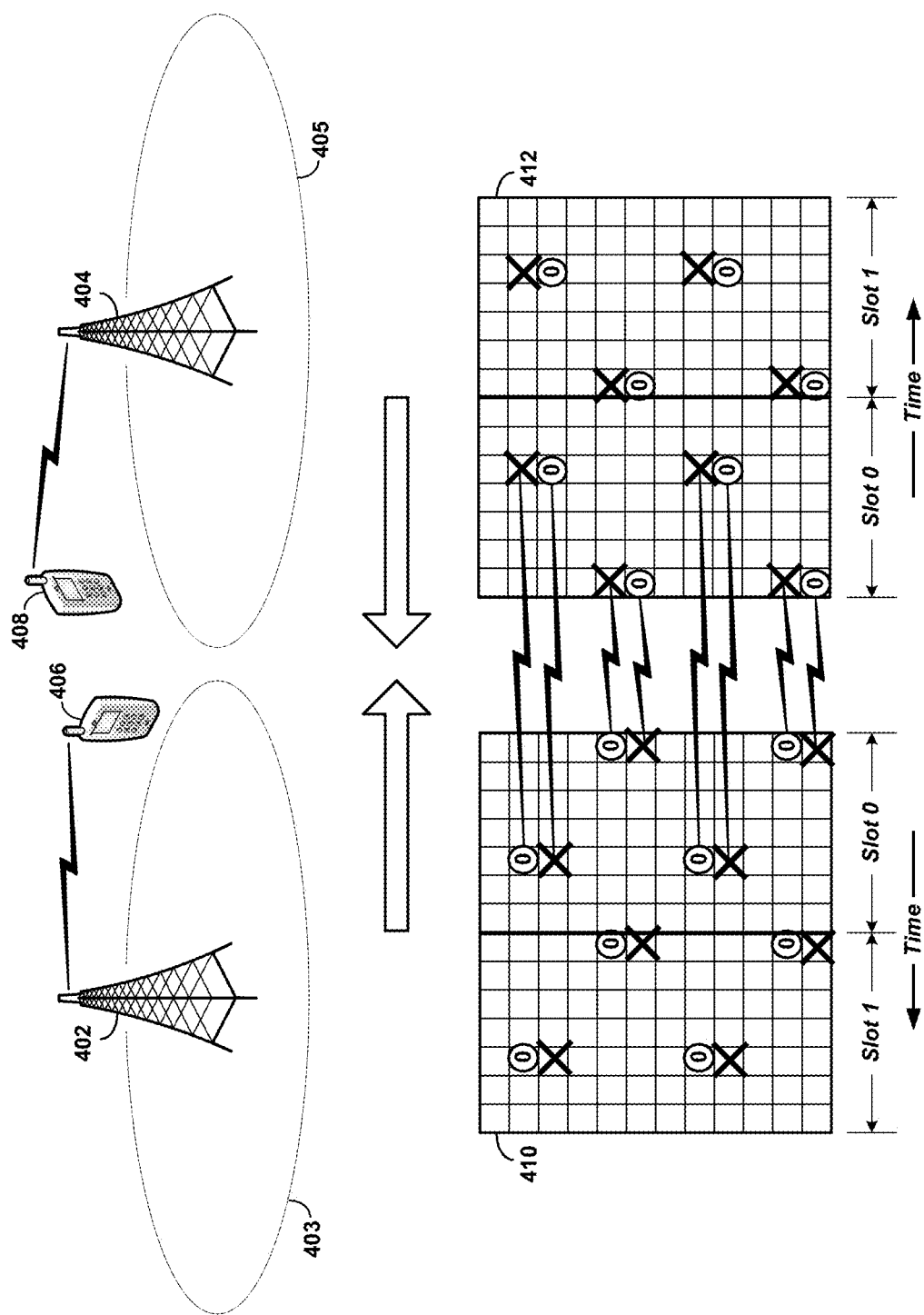
FIG. 4 is a conceptual illustration of interference between resource elements carrying downlink reference signals from one base station and resource elements carrying downlink data from another base station.

As noted, in conventional LTE operation, the CRS will be transmitted by default on all RBs across a carrier band during each TTI (sub-frame), and according to the applicable antenna configuration. While CRS transmission is needed for proper operation of the air interface of an LTE system, REs carrying the CRS transmitted by one eNodeB can cause interference with REs carrying data transmitted by a neighboring eNodeB. An example of this type of interference is illustrated in FIG. 4, the top portion of which shows two neighboring base stations 402 and 404 serving respective UEs 406 and 408 within respective neighboring coverage areas 403 and 405. The two UEs 406 and 408 are taken to be operating near adjacent boundaries of the coverage areas, making the downlink transmissions they are receiving more susceptible to interference.

By way of example, the eNodeB 402 transmits a RB 410 to the UE 406 during a given sub-frame and on a given group of sub-carrier frequencies, and the eNodeB 404 simultaneously transmits a RB 412 to the UE 408 during the given sub-frame and on the same given group of sub-carrier frequencies. Also by way of example, the RBs are transmitted by the respective eNodeBs on just one antenna port. In practice, either eNodeB could transmit more than one RB to a given UE during a given sub-frame by scheduling on each of multiple groups of sub-carriers that each correspond to different RB, and could also transmit on more than one antenna port. There is no loss in generality, however, to consider just one RB and one antenna port, as in FIG. 4, though. For purposes of convenience in illustrating interference, the direction of time increase for the RB 410 is to the left, the mirror image of the direction time increase for the RB 412. The broad "head-on" arrows above the RBs indicate the potential for overlap between the respective transmissions.

The arrangement of REs that carry the CRS in each of the RBs 410 and 412 also illustrate how the respective patterns are offset in sub-carrier frequency with respect to one another in order to avoid interference of CRS. In the example illustrated, the REs carrying the CRS are each marked with a circled "0." As shown, the pattern in the RB 410 is offset by one sub-carrier frequency above the pattern in the RB 412. While this avoids interference between CRS transmissions from neighboring base stations, it can lead to interference between the REs carrying CRS from one base station and corresponding REs carrying used data from another neighboring base station. This RE-to-RE interference is indicated in FIG. 4 by an "X" in REs of one RB that suffer interference from the CRS in corresponding REs of the other RB.

As a visual cue, a black "lightning-bolt" line connects a CRS in one RE with the user data that suffers interference in the corresponding RE. For the sake of brevity in the figure, a connecting line is not shown for all interference pairs. The interference arises because the corresponding REs in different downlink RBs overlap in time and frequency. In particular, the CRS is transmitted in all downlink RBs by default in conventional LTE operation. Thus, there are as many possible of instances of interference in both time and frequency as there are REs allocated for CRS transmission. However, there are various types and/or modes of downlink transmissions, as well as scheduling circumstances, which do not require CRS transmission, at least not in every RB of the carrier band. In accordance with example embodiments, opportunities for muting or omitting CRS transmission can be taken in order to reduce the instances of interference, and thereby improve the reception reliability at UEs of downlink transmissions.

Figure 5:
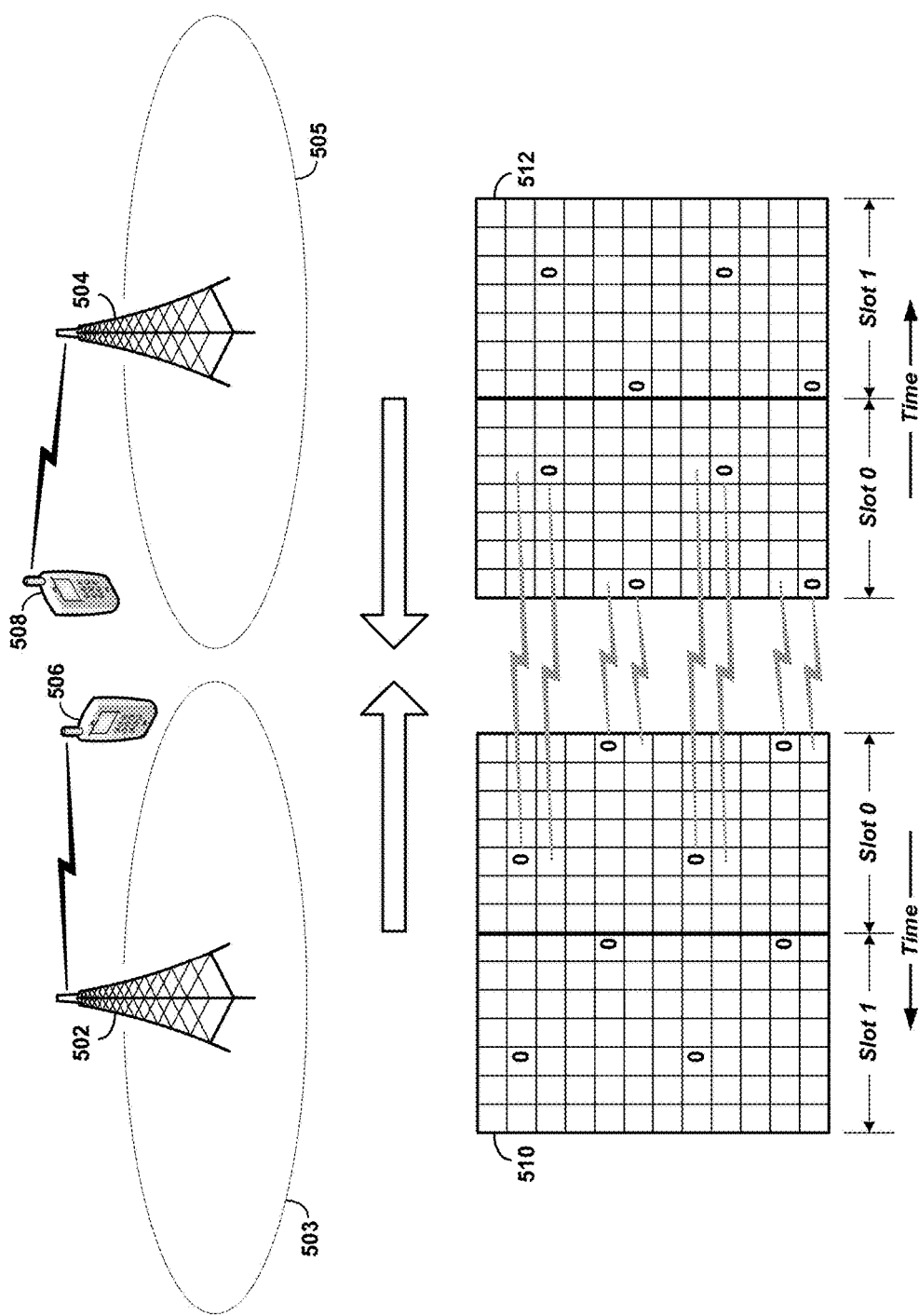
FIG. 5 is a conceptual illustration of muting of resource downlink reference signals from a base station, in accordance with example embodiments.

FIG. 5 is a conceptual illustration of muting of resource downlink reference signals from a base station to reduce or avoid interference, in accordance with example embodiments. Similar to the example in FIG. 4, the depicting in FIG. 5 shows two neighboring base stations 502 and 504 serving respective UEs 506 and 508 within respective neighboring coverage areas 503 and 505. The two UEs 506 and 508 are taken to be operating near adjacent boundaries of the coverage areas, making the downlink transmissions they are receiving more susceptible to interference. The eNodeB 502 transmits a RB 510 to the UE 506 during a given sub-frame and on a given group of sub-carrier frequencies, and the eNodeB 504 simultaneously transmits a RB 512 to the UE 508 during the given sub-frame and on the same given group of sub-carrier frequencies. Again in this example, the RBs are transmitted by the respective eNodeBs on just one antenna port, and time directions of the two RBs 510 and 512 mirror each other for purposes of illustration.

In accordance with example embodiments, a base station may determine if the default transmission of a CRS can be muted or omitted in any of downlink RB scheduled during a given sub-frame. If so, those RBs for which muting or omission of the CRS is permissible will be identified, and transmission of the CRS in REs allocated by default in identified downlink RBs will be muted or omitted. As a result, corresponding REs in corresponding downlink RBs transmitted by a neighboring base station will not be subject to the type of interference illustrated in FIG. 4.

Also in accordance with example embodiments, neighboring base stations may coordinate scheduling of downlink RBs so as to maximize the mutual opportunities for avoiding interference caused by CRS transmission. For example, pairs of eNodeBs in a wireless network configured for operating according to LTE can communicate directly with each other via the "X2" interface. Thus, the eNodeBs 502 and 504 may exchange information over a shared X2 connection in order to coordinate CRS muting during common sub-frames and on corresponding downlink RBs.

This is shown by way of example in FIG. 5, where the REs allocated for default CRS transmission in each of the downlink RBs 510 and 512 are still identified by a "0," but the absence of a circle around each "0" indicates muting or omission during transmission. As a visual cue, the lightning-bolt lines connection correspond REs in the downlink RBs 510 and 512 are displayed in light gray to signify the absence or suppression of CRS interference. Coordination of muting of CRS transmission is represented by muting of CRS in both downlink RBs 510 and 512. That is, both eNodeBs 502 and 504 may communicate with each other to arrange, as much as possible, to schedule CRS muting in corresponding downlink RBs during the same sub-frames.

While the illustration in FIG. 5 is described in terms of CRS transmission, muting default transmission of downlink reference signals when allowed by specific types of transmissions and/or in specific circumstance can be applied to other types of reference signals and/or in wireless networks that operate according to other (or additional) protocols and specification besides LTE. In more general terms, a particular type of downlink reference signal may be scheduled for default transmission during a given sub-frame, or other time interval for transmission, and across all frequency resources of a carrier band specified for the particular reference signal. For example, the default transmission could be scheduled during designated time-frequency elements ("TFEs") or segments during each sub-frame. The default transmission may result in interference with transmission of user data in some instances, even while transmission may not always be strictly needed. By identifying when and under what conditions the default transmissions can be muted, some degree of interference may thus be avoided.

Returning again to the example of LTE, downlink transmission may be made according to one of various "transmission modes" ("TMs") that specify one or another antenna configuration used in transmission. Table 1 illustrates 10 TMs currently available in LTE. The TMs are identified as TM1-TM10. Each row entry of Table 1 includes a TM index (1, ..., 10), an LTE release version in which the TM was introduced, and a brief description.

TABLE 1

| TM | LTE Release | Description |
|---|---|---|
| 1 | 8 | Single antenna port single-input multiple output (SIMO) |
| 2 | 8 | Transmit diversity |
| 3 | 8 | Open loop spatial multiplexing |
| 4 | 8 | Closed loop spatial multiplexing |
| 5 | 8 | Multi-user multiple-input multiple output (MIMO) |
| 6 | 8 | Closed loop rank 1 precoding |
| 7 | 8 | Single stream beamforming |
| 8 | 9 | Dual stream beamforming |
| 9 | 10 | UE-RS based SU-/MU-MIMO |
| 10 | 11 | TM9 enhancements to support inter-cell coordination (CoMP) |

Figure 6:
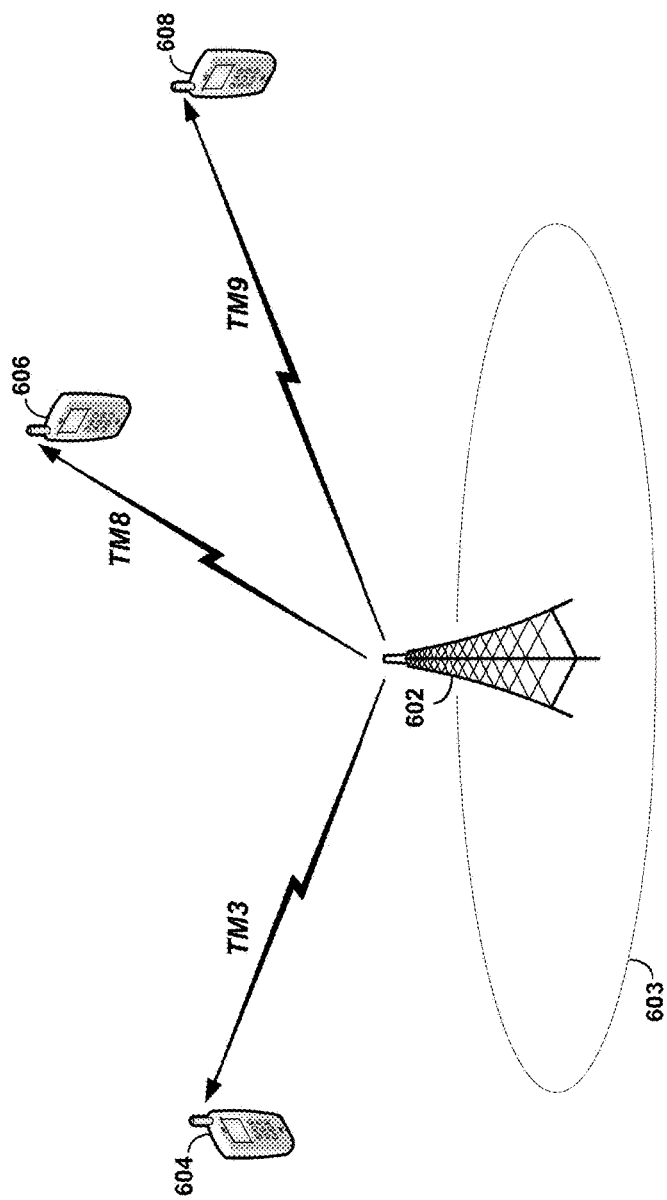
FIG. 6 is illustration of concurrent downlink transmissions using different transmission modes, in accordance with example embodiments.

For purposes of the present disclosure, it is only necessary to consider that default transmission of the CRS can be omitted for TM7-TM10 under certain circumstances, although in conventional operation in LTE, default transmission of the CRS is carried out for all transmission modes. More specifically, during any sub-frame for which all downlink RBs are designated for TM10, CRS transmission may be muted or omitted in at least a subset of the RBs. Similarly, during any sub-frame for which multiple streams are scheduled for downlink transmission in RBs designated for multiple transmission modes including any of TM1-TM4 and any of TM 7-TM10, CRS transmission may be muted or omitted in at least some of the RBs designated for TM 7-TM10 transmission. FIG. 6 illustrates an example in which an eNodeB 602 with a coverage are 603 transmits to three UEs 604, 606, and 608 using TM3, TM8, and TM10, respectively. In this example scenario, it can be possible to omit CRS transmission to the UEs 606 and 608.

In accordance with example embodiments, then, selection of one of TM 7-TM10 for a given downlink RB is a necessary condition for omission of default CRS transmission in the given RB. In addition, one or more other conditions that would require default CRS transmission must not exist for the given RB in order to then actually omit or mute the CRS transmission during transmission of the given RB. Specifically, in order to ensure some level of detectability of the CRS during each sub-frame, default transmission can be maintained on all RBs that allocated sub-carriers in central region of the carrier band. For example, for a 5 MHz carrier band, the central six RBs may be designated as requiring default CRS transmission. Other arrangements of RBs in the central region of a carrier band can be used as well.

Other types of transmissions that may be deemed as always requiring default CRS transmission can include RBs transmitted in sub-frames that are designated for broadcast of system information, referred to as "system information block" ("SIB") sub-frames, and paging sub-frames, during which paging messages are transmitted. In addition, reliable detection the CRS transmission is need during connection set up between an eNodeB and a UE. Thus, default transmission of the CRS can also be required during sub-frames during which a connection set up is being carried out. These conditions—RBs near the center of the carrier band, SIP sub-frames, paging sub-frames, and connection set up—may be considered a list of when default CRS transmission is required.

In accordance with example embodiments, muting or omission of default CRS transmission may be applied to a RB for which TM7-TM10 may be selected for a scheduled transmission, and for which none of the list of conditions requiring default CRS transmission applies. During any given sub-frame (or TTI), a first subset of RBs for which TM7-TM10 is selected may be identified, and second subset of RBs for which none of the requirement conditions applies can also be identified. A third subset derived as a combinatory intersection (e.g., a Venn diagram) of the first and second subsets can then be considered those RBs for which muting or omission of default CRS transmission may be applied.

Because muting or omission of default CRS transmission can help reduce or eliminate interference of CRS with downlink user data, the first subset of RBs—those for which TM7-TM10 is selected—may be those allocated for downlink transmission to UEs most in need of the benefit of reduced or eliminate interference. CRS interference will tend to be strongest near the boundaries between coverage areas of base stations, which are generally located in the outer reaches of the coverage areas where downlink signal strength is weakest. Hence, one criteria for identifying UEs that should be designated for receiving transmissions according to TM7-TM10 is to identify those UEs reporting relatively low downlink signal quality. For example, UEs reporting signal to interference plus noise (SINR) below a threshold level may be considered candidates for TM7-TM10 transmissions. Conversely, UEs reporting SINR above threshold level can be allocated RBs designated for TM3-TM4 transmissions.

Figure 7:
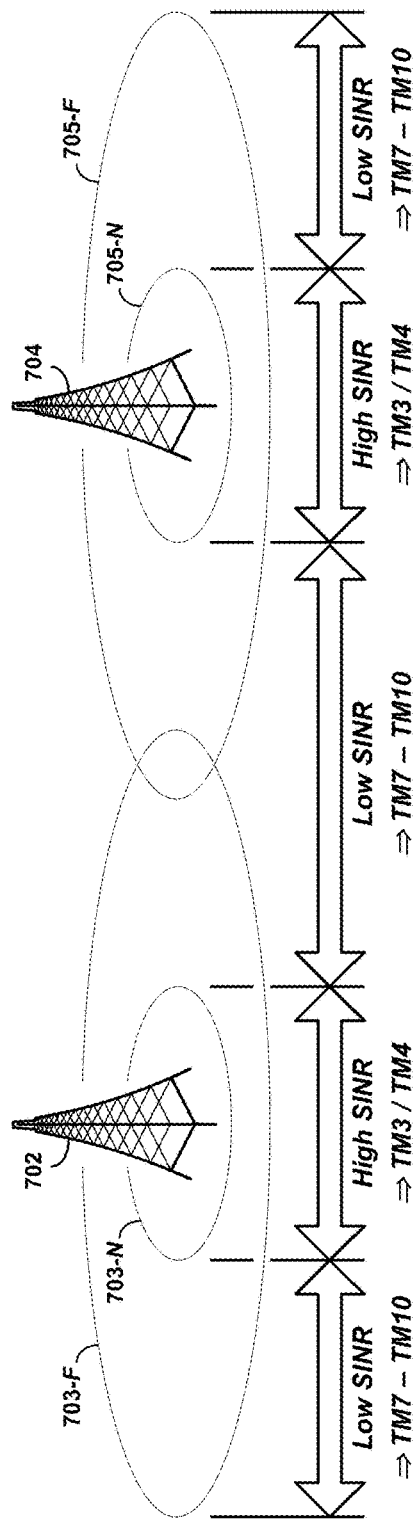
FIG. 7 is a conceptual illustration of assigning different transmission modes based on signal to interference and noise ratio, in accordance with example embodiments.

FIG. 7 illustrates a likely correspondence between reported SINR and location with respect to the base station. As shown, FIG. 7 includes a first base station 702 with a coverage area represented as a near area 703-N and a far area 703-F and a second base station 704 with a coverage area represented as a near area 705-N and a far area 705-F. In this example illustration, the near and far areas of each base station are not necessarily defined in terms of precise distance from the respective base stations, but rather are defined in terms of conceptual zones according to reported SINR. Thus, the near areas of both base stations are one for which reported SINR is high, for example, above a threshold. Conversely, the far areas of both base stations are one for which reported SINR is low, for example, below the threshold. Note that the areas of low SINR between the base stations 702 and 704 are depicted as partially overlapping. Thus, UEs in this area (and reporting low SINR) may be particularly susceptible to CRS interference from the neighboring base station. While UEs in the outer areas opposite the boundary region may not necessarily be subject to CRS interference from one or the other of the base station 702 and 704, there could be additional base stations not shown in the figure that have bordering outer coverage areas, and may thus be subject to CRS interference from one or another of these additional base stations.

In accordance with example embodiments, two base stations, such as 502 and 504 or 702 and 704, can coordinate with each other to determine which of the UEs they are respectively serving are reporting SINR below a threshold. The base stations can then attempt to schedule downlink transmissions to those UEs on the same (i.e., corresponding) RBs during the same sub-frames, and select TM7-TM10 for those transmissions. This will at least make all such transmission eligible for CRS muting. Actual muting of CRS transmissions for these RBs would then be subject determining that none of the list of conditions requiring default CRS transmission holds. By coordinating in this way, each base station would help alleviate CRS interference it might otherwise cause for UEs served by the other base station. Coordination could be extended to any pair of base stations.

In further accordance with example embodiments, specific sub-frames of each frame can be designated for TM7-TM10 transmissions. For example, of the ten sub-frames in each frame, even-numbered frame could be allocated for TM1-TM6 transmissions, and odd-numbered frame could be allocated for TM7-TM10 transmissions. Other arrangements could be used as well. Pre-designating sub-frames in this way could help simplify coordination of CRS muting among pairs of base stations.

Figure 8:
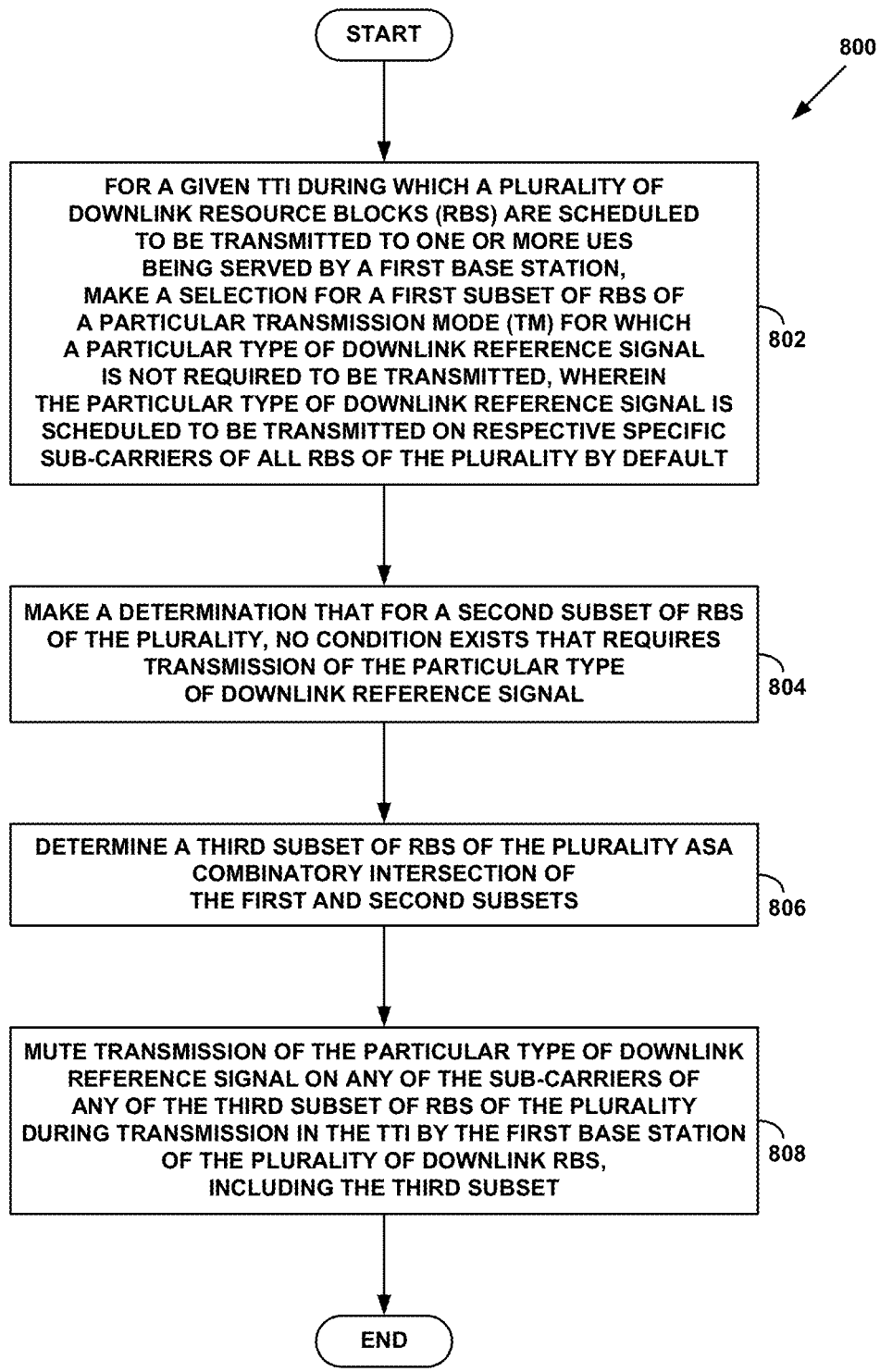
FIG. 8 is a flowchart illustrating an example method for muting resource downlink reference signals from a base station, in accordance with example embodiments.

FIG. 8 is a flowchart illustrating an example method 800 for muting resource downlink reference signals from a base station, in accordance with example embodiments. Example methods, such as method 800, may be carried out in whole or in part a wireless communication network by one or more base stations and/or other components, such as by the eNodeB 112 of the representative LTE RAN 100 shown in FIG. 1, using one or more of the air interface arrangements shown in FIGS. 2A-2B. However, it should be understood that example methods, such as method 800, may be carried out by other entities or combinations of entities as well as in other arrangements, without departing from the scope of the invention. By way of example, the method 800 can be implemented as machine language instructions that can be stored on non-transient machine-readable media (e.g, solid state memory, magnetic disk, etc), and that when executed by one or more processors of a base station to cause the base station to carry out operations, steps, and/or functions of the method.

In an example embodiment, method 800 may operable in a wireless communication network including a first base station configured for serving user equipment devices (UEs) within a first coverage area of the first base station.

As shown by block 802 in FIG. 8, method 800 involves, for a given transmission time interval (TTI) during which a plurality of downlink resource blocks (RBs) are scheduled to be transmitted to one or more UEs being served by the first base station, making a selection for a first subset of RBs of the plurality of a particular transmission mode (TM) for which a particular type of downlink reference signal is not required to be transmitted. In particular, each of the scheduled RBs of the plurality is allocated one of a plurality of distinct groups of sub-carrier frequencies of a carrier band during the given TTI, and the particular type of downlink reference signal is scheduled to be transmitted on respective specific sub-carriers of all RBs of the plurality by default.

As shown by block 804 in FIG. 8, method 800 next involves making a determination that for a second subset of RBs of the plurality, no condition exists that requires transmission of the particular type of downlink reference signal.

As shown by block 806 in FIG. 8, method 800 next involves determining a third subset of RBs of the plurality as a combinatory intersection of the first and second subsets.

Finally, as shown by block 808, method 800 involves muting transmission of the particular type of downlink reference signal on any of the sub-carriers of any of the third subset of RBs of the plurality during transmission in the TTI by the first base station of the plurality of downlink RBs, including the third subset.

In accordance with example embodiments, making the selection can entail identifying from among the one or more UEs particular UEs for which downlink interference is suppressing downlink data rates used by the first base station for downlink data transmissions, and then identifying the first subset of RBs as those downlink RBs scheduled for transmission to the identified particular UEs during the TTI. In an example embodiment, making the identification of the particular UEs could entail identifying UEs that are reporting signal to interference plus noise ratios (SINRs) below a threshold SINR.

In accordance with example embodiments, the given TTI could be one of a sequence of sub-frames of a transmission frame, and making the selection could entail selecting the particular TM for all downlink RBs scheduled for transmission to UEs during every other sub-frame of the sequence of sub-frames. In this case, the given TTI would one of the every other sub-frames, and the first subset could be all of the plurality of downlink RBs scheduled to be transmitted during the given TTI.

In accordance with example embodiments, muting the transmission of the particular type of downlink reference signal on any of the sub-carriers of any of the third subset of RBs could entail omitting default transmission of the particular downlink reference signal within any RBs of the third subset during transmission in the TTI of the plurality of RBs.

Also in accordance with example embodiments, the wireless communication system could include a second base station configured for serving UEs within a second coverage area of the second base station, where the second coverage area neighboring the first coverage area. In particular, the first and second base stations may schedule transmissions of downlink RBs to their respectively served UEs during time-synchronized sequences of sub-frames of time-synchronized frames, and on respective groups of the plurality of distinct groups of sub-carrier frequencies allocated from the carrier band, and the given TTI could be one of the sub-frames. With this arrangement, the method could further entail coordinating between the first and second base stations so as to maximize a mutual occurrence in at least the TTI of the particular TM being selected for scheduled transmissions of downlink RBs on the same respective groups of sub-carrier frequencies of the carrier band at both base stations. That is, the first subset of RBs could include at least those of the mutual occurrence that are scheduled for transmission by the first base station. With this scheduling, the method could still further entail determining a fourth subset of RBs for which no condition exists that requires transmission of the particular type of downlink reference signal, where the fourth subset of RBs is identified from among those of the mutual occurrence that are scheduled for transmission by the second base station. Having identified the fourth set, the method could then entail muting transmission of the particular type of downlink reference signal on any of the sub-carriers of any of the fourth subset of RBs during transmission in the TTI by the second base station of downlink RBs, including the fourth subset.

In further accordance with example embodiments, coordinating between the first and second base stations to maximize a mutual occurrence could entail identifying UEs served by the first base station and UEs served by the second base station that are reporting SINRs below a threshold SINR.

In accordance with example embodiments in which the wireless communication system is configured to operate according at least to LTE, the given TTI could one of a sequence of sub-frames of a transmission frame during which downlink RBs are scheduled and transmitted to UEs. In this case, the first subset could be all of the plurality of downlink RBs scheduled to be transmitted during the given TTI. In an LTE system, the downlink RBs include resource elements (REs) arrayed in consecutive symbol times spanning a sub-frame and consecutive sub-carriers spanning a different one of the plurality of distinct groups of sub-carrier frequencies. For LTE embodiments, the particular TM may be one of TM7 through TM10, and the particular type of downlink reference signal could be a Cell-specific Reference Signal (CRS) that scheduled by default for transmission on respective specific REs of each downlink RB. Then, muting transmission of the particular type of downlink reference signal on any of the sub-carriers of any of the third subset of RBs of the plurality during transmission in the TTI could entail transmitting each of the third subset of RBs using one of TM7 through TM10, and omitting default transmission of the CRS in any of the respective specific REs of the downlink RBs of the third subset of RBs during the transmitting.

In further accordance with LTE embodiments, making the determination that for the second subset of RBs of the plurality, no condition exists that requires transmission of the particular type of downlink reference signal can entail determining for each given downlink RB of the second subset that none of a list of specific conditions holds. In an example LTE embodiment, the list of conditions could include: (i) the given downlink RB being one of a particular group RBs that, because they are allocated sub-carrier frequencies in a central portion of the carrier band, are required to carry default CRS transmissions; (ii) the TTI being scheduled in a System Information Block (SIB) sub-frame; (iii) the TTI being scheduled in a Paging sub-frame; and (iv) the TTI being scheduled during a connection set-up.

It will be appreciated that the example method 800 could each include alternate and/or additional steps, while still remaining within the scope and spirit of example embodiments herein.

Figure 9:
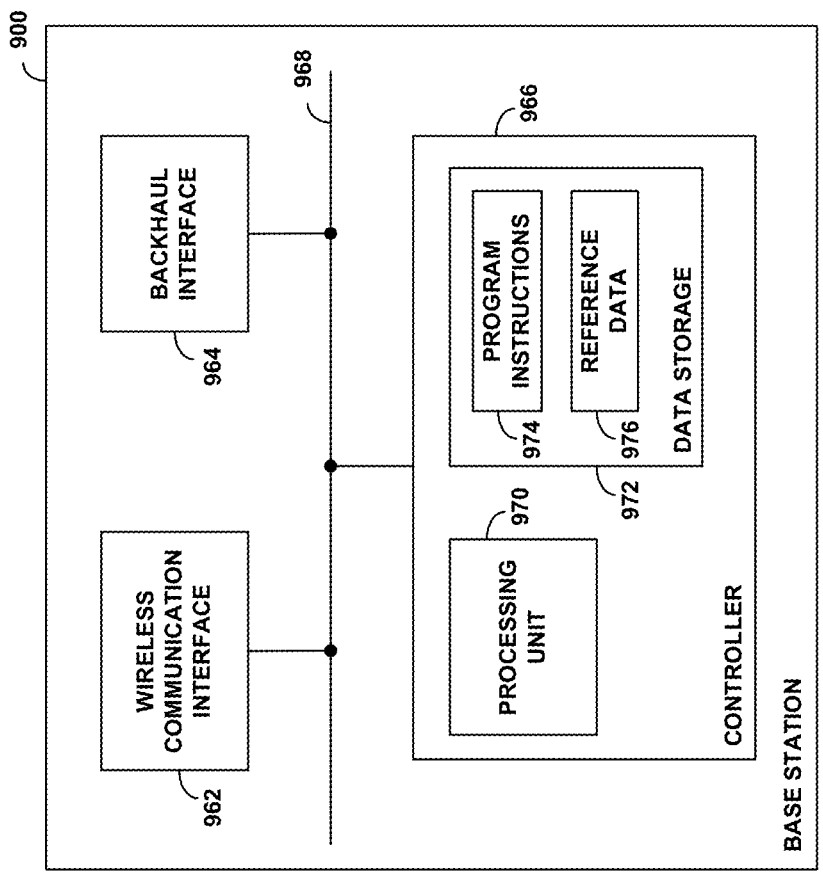
FIG. 9 is a simplified block diagram of an example base station, in accordance with example embodiments.

FIG. 9 is next a simplified block diagram of a base station 900 (such as the eNodeB 112 in FIG. 1), showing some of the components that such an entity could include in accordance with an example implementation. In particular, the example base station could configured to mute default CRS transmission when permissible in order to help reduce interference.

As shown in FIG. 9, the example base station includes a wireless communication interface 962, a backhaul interface 964, and a controller 966, all of which could be coupled together or otherwise interconnected by a system bus, network, or other connection mechanism 968. Further, these or other components of the base station could be integrated together in various ways.

In the example base station, the wireless communication interface 946 could be configured to engage in wireless communication with UE via an air interface between the base station and the UE. As such, the wireless communication interface could include a radio compliant with the protocol that the base station will use for communication with the UE station, such as LTE for instance, and could further include an OFDM transceiver and an antenna structure for transmitting on a downlink and receiving on an uplink of the air interface. The backhaul interface 964 may then be a wired or wireless interface for communicating with various core network entities, such as with an SGW and MME as discussed above for instance.

The controller 966, in turn, could be configured to control operation of the base station including implementing various base station operations described herein, such as muting CRS transmission and coordinating scheduling with a neighboring base station, as described above.

As shown by way of example, the controller 966 could include a processing unit 970 and data storage 972. Processing unit 970 could comprise one or more general purpose processors (e.g., microprocessors) and/or one or more special-purpose processors (e.g., application specific integrated circuits or digital signal processors). And data storage 972 could comprise one or more non-transitory volatile and/or non-volatile storage components, such as magnetic, optical, or flash memory, and could hold or be encoded with program instructions 974 and reference data 976. Program instructions 974 could be executable by processing unit 970 to carry out various base station operations described herein. And reference data 976 could include various data to facilitate carrying out the operations, such as those described above.

Exemplary embodiments have been described above. Those skilled in the art will understand, however, that changes and modifications may be made to these embodiments without departing from the true scope and spirit of the invention.

We claim:

1. A method operable in a wireless communication network including a first base station configured for serving user equipment devices (UEs) within a first coverage area of the first base station, the method comprising:

for a given transmission time interval (TTI) during which a plurality of downlink resource blocks (RBs) are scheduled to be transmitted to one or more UEs being served by the first base station, making a selection for a first subset of RBs of the plurality of a particular transmission mode (TM) for which a particular type of downlink reference signal is not required to be transmitted, wherein each of the scheduled RBs of the plurality is allocated one of a plurality of distinct groups of sub-carrier frequencies of a carrier band during the given TTI, and the particular type of downlink reference signal is scheduled to be transmitted on respective specific sub-carriers of all RBs of the plurality by default;

making a determination that for a second subset of RBs of the plurality, no condition exists that requires transmission of the particular type of downlink reference signal;

determining a third subset of RBs of the plurality as an overlap of the first and second subsets; and muting transmission of the particular type of downlink reference signal on any of the sub-carriers of any of the third subset of RBs of the plurality during transmission in the TTI by the first base station of the plurality of downlink RBs.

2. The method of claim 1, wherein making the selection comprises:

identifying from among the one or more UEs particular UEs for which downlink interference is suppressing downlink data rates used by the first base station for downlink data transmissions; and identifying the first subset of RBs as those downlink RBs scheduled for transmission to the identified particular UEs during the TTI.

3. The method of claim 2, wherein identifying from among the one or more the UEs particular UEs for which downlink interference is suppressing downlink data rates used by the first base station for downlink data transmissions comprises identifying UEs that are reporting signal to interference plus noise ratios (SINRs) below a threshold SINR.

4. The method of claim 1, wherein the given TTI is one of a sequence of sub-frames of a transmission frame, and wherein making the selection comprises selecting the particular TM for all downlink RBs scheduled for transmission to UEs during every other sub-frame of the sequence of sub-frames, the given TTI being one of the every other sub-frames, and the first subset being all of the plurality of downlink RBs scheduled to be transmitted during the given TTI.

5. The method of claim 1, wherein muting the transmission of the particular type of downlink reference signal on any of the sub-carriers of any of the third subset of RBs comprises omitting default transmission of the particular downlink reference signal within any RBs of the third subset during transmission in the TTI of the plurality of RBs.

6. The method of claim 1, wherein the wireless communication system includes a second base station configured for serving UEs within a second coverage area of the second base station, the second coverage area neighboring the first coverage area,
wherein the first and second base stations schedule transmissions of downlink RBs to their respectively served UEs during time-synchronized sequences of sub-frames of time-synchronized frames, and on respective groups of the plurality of distinct groups of sub-carrier frequencies allocated from the carrier band,
wherein the given TTI is one of the sub-frames,
and wherein the method further comprises:
coordinating between the first and second base stations to maximize a mutual occurrence in at least the TTI of the particular TM being selected for scheduled transmissions of downlink RBs on the same respective groups of sub-carrier frequencies of the carrier band at both base stations, the first subset of RBs including at least those of the mutual occurrence that are scheduled for transmission by the first base station;
determining a fourth subset of RBs for which no condition exists that requires transmission of the particular type of downlink reference signal, the fourth subset of RBs being identified from among those of the mutual occurrence that are scheduled for transmission by the second base station; and
muting transmission of the particular type of downlink reference signal on any of the sub-carriers of any of the fourth subset of RBs during transmission in the TTI by the second base station of downlink RBs, including the fourth subset.

7. The method of claim 6, wherein coordinating between the first and second base stations to maximize a mutual occurrence comprises identifying UEs served by the first base station and UEs served by the second base station that are reporting signal to interference plus noise ratios (SINRs) below a threshold SINR.

8. The method of claim 1, wherein the wireless communication system is configured to operate according at least to LTE,
wherein the given TTI is one of a sequence of sub-frames of a transmission frame during which downlink RBs are scheduled and transmitted to UEs, the first subset being all of the plurality of downlink RBs scheduled to be transmitted during the given TTI,
wherein each of the downlink RBs comprises resource elements (REs) arrayed in consecutive symbol times spanning a sub-frame and consecutive sub-carriers spanning a different one of the plurality of distinct groups of sub-carrier frequencies,
wherein the particular TM is one of TM7 through TM10,
wherein the particular type of downlink reference signal is a Cell-specific Reference Signal (CRS), scheduled by default for transmission on respective specific REs of each downlink RB,
and wherein muting transmission of the particular type of downlink reference signal on any of the sub-carriers of any of the third subset of RBs of the plurality during transmission in the TTI comprises:
transmitting each of the third subset of RBs using one of TM7 through TM10; and
omitting default transmission of the CRS in any of the respective specific REs of the downlink RBs of the third subset of RBs during the transmitting.

9. The method of claim 8, wherein making the determination that for the second subset of RBs of the plurality, no condition exists that requires transmission of the particular type of downlink reference signal comprises determining for each given downlink RB of the second subset that none of a list of conditions holds, the list being:
(i) the given downlink RB being one of a particular group RBs that, because they are allocated sub-carrier frequencies in a central portion of the carrier band, are required to carry default CRS transmissions;
(ii) the TTI being scheduled in a System Information Block (SIB) sub-frame;
(iii) the TTI being scheduled in a Paging sub-frame; and
(iv) the TTI being scheduled during a connection set-up.

10. A wireless communication network comprising:
a first base station configured for serving user equipment devices (UEs) within a first coverage area of the first base station;
one or more processors configured as part of at least in the first base station; and
memory accessible to the one or more processors, and storing machine language instructions that, upon execution by the one or more processors, cause the wireless communication network to carry out operations including:
for a given transmission time interval (TTI) during which a plurality of downlink resource blocks (RBs) are scheduled to be transmitted to one or more UEs being served by the first base station, making a selection for a first subset of RBs of the plurality of a particular transmission mode (TM) for which a particular type of downlink reference signal is not required to be transmitted, wherein each of the scheduled RBs of the plurality is allocated one of a plurality of distinct groups of sub-carrier frequencies of a carrier band during the given TTI, and the particular type of downlink reference signal is scheduled to be transmitted on respective specific sub-carriers of all RBs of the plurality by default;
making a determination that for a second subset of RBs of the plurality, no condition exists that requires transmission of the particular type of downlink reference signal;
determining a third subset of RBs of the plurality as an overlap of the first and second subsets; and
muting transmission of the particular type of downlink reference signal on any of the sub-carriers of any of the third subset of RBs of the plurality during transmission in the TTI by the first base station of the plurality of downlink RBs.

11. The wireless communication network of claim 10, wherein making the selection comprises:
identifying from among the one or more UEs particular UEs that are reporting signal to interference plus noise ratios (SINRs) below a threshold SINR; and
identifying the first subset of RBs as those downlink RBs scheduled for transmission to the identified particular UEs during the TTI.

12. The wireless communication network of claim 10, wherein the given TTI is one of a sequence of sub-frames of a transmission frame,
and wherein making the selection comprises selecting the particular TM for all downlink RBs scheduled for transmission to UEs during every other sub-frame of the sequence of sub-frames, the given TTI being one of the every other sub-frames, and the first subset being all of the plurality of downlink RBs scheduled to be transmitted during the given TTI.

13. The wireless communication network of claim 10, wherein muting the transmission of the particular type of downlink reference signal on any of the sub-carriers of any of the third subset of RBs comprises omitting default transmission of the particular downlink reference signal within any RBs of the third subset during transmission in the TTI of the plurality of RBs.

14. The wireless communication network of claim 10, further comprising a second base station configured for serving UEs within a second coverage area of the second base station, the second coverage area neighboring the first coverage area,
wherein the one or more processors are further configured as part of at least in the second base station,
wherein the first and second base stations schedule transmissions of downlink RBs to their respectively served UEs during time-synchronized sequences of sub-frames of time-synchronized frames, and on respective groups of the plurality of distinct groups of sub-carrier frequencies allocated from the carrier band,
wherein the given TTI is one of the sub-frames,
and wherein the operations further include:
identifying UEs served by the first base station and UEs served by the second base station that are reporting signal to interference plus noise ratios (SINRs) below a threshold SINR;
for at least the identified UEs, coordinating between the first and second base stations to maximize a mutual occurrence in at least the TTI of the particular TM being selected for scheduled transmissions of downlink RBs on the same respective groups of sub-carrier frequencies of the carrier band at both base stations, the first subset of RBs including at least those of the mutual occurrence that are scheduled for transmission by the first base station;
determining a fourth subset of RBs for which no condition exists that requires transmission of the particular type of downlink reference signal, the fourth subset of RBs being identified from among those of the mutual occurrence that are scheduled for transmission by the second base station; and
muting transmission of the particular type of downlink reference signal on any of the sub-carriers of any of the fourth subset of RBs during transmission in the TTI by the second base station of downlink RBs, including the fourth subset.

15. The wireless communication network of claim 10, wherein the wireless communication system is configured to operate according at least to LTE,
wherein the given TTI is one of a sequence of sub-frames of a transmission frame during which downlink RBs are scheduled and transmitted to UEs, the first subset being all of the plurality of downlink RBs scheduled to be transmitted during the given TTI,
wherein each of the downlink RBs comprises resource elements (REs) arrayed in consecutive symbol times spanning a sub-frame and consecutive sub-carriers spanning a different one of the plurality of distinct groups of sub-carrier frequencies,
wherein the particular TM is one of TM7 through TM10,
wherein the particular type of downlink reference signal is a Cell-specific Reference Signal (CRS), scheduled by default for transmission on respective specific REs of each downlink RB,
and wherein muting transmission of the particular type of downlink reference signal on any of the sub-carriers of any of the third subset of RBs of the plurality during transmission in the TTI comprises:
transmitting each of the third subset of RBs using one of TM7 through TM10; and
omitting default transmission of the CRS in any of the respective specific REs of the downlink RBs of the third subset of RBs during the transmitting.

16. The wireless communication network of claim 15, wherein making the determination that for the second subset of RBs of the plurality, no condition exists that requires transmission of the particular type of downlink reference signal comprises determining for each given downlink RB of the second subset that none of a list of conditions holds, the list being:
(i) the given downlink RB being one of a particular group RBs that, because they are allocated sub-carrier frequencies in a central portion of the carrier band, are required to carry default CRS transmissions;
(ii) the TTI being scheduled in a System Information Block (SIB) sub-frame;
(iii) the TTI being scheduled in a Paging sub-frame; and
(iv) the TTI being scheduled during a connection set-up.

17. A wireless communication network comprising:
a first base station configured for serving user equipment devices (UEs) within a first coverage area of the first base station by, at least, scheduling and transmitting downlink resource blocks (RBs) arrayed over repeating sequences of sub-frames of repeating frames in time and over contiguous groupings of sub-carrier frequencies of a carrier band, wherein specific time-frequency elements (TFEs) of each downlink RB from the first base station are allocated for default transmission of a particular downlink reference signal;
a second base station configured for serving UEs within a second coverage area of the second base station by, at least, scheduling and transmitting downlink RBs arrayed over the repeating sequences of sub-frames of the repeating frames in time and over the contiguous groupings of sub-carrier frequencies of the carrier band, wherein specific TFEs of each downlink RB from the second base station are allocated for default transmission of the particular downlink reference signal, wherein the first and second coverage areas neighbor each other;
one or more processors in the first and second base stations; and
memory accessible to the one or more processors, and storing machine language instructions that, upon execution by the one or more processors, cause the wireless communication network to carry out operations including:
for a given sub-frame, coordinating at the first and second base stations scheduling of transmission of (i) at least one downlink RB from the first base station to at least one UE that is reporting to the first base station a signal to interference plus noise ratio (SINR) below a threshold SINR, and (ii) at least one downlink RB from the second base station to at least one UE that is reporting to the second base station a SINR below the threshold SINR;

for both the scheduled at least one downlink RB from the first base station and the scheduled at least one downlink RB from the second base station, selecting a particular transmission mode (TM) for which the particular type of downlink reference signal is not required to be transmitted;

for both the scheduled at least one downlink RB from the first base station and the scheduled at least one downlink RB from the second base station, making a determination that no condition exists that requires transmission of the particular type of downlink reference signal; and during synchronous transmission in the given sub-frame of both the scheduled at least one downlink RB from the first base station and the scheduled at least one downlink RB from the second base station, muting transmission of the particular type of downlink reference signal in any of the TFEs of the at least one downlink RB from the first base station and any of the TFEs of the at least one downlink RB from the second base station.

18. The wireless communication network of claim 17, wherein the operations further comprise:

for a subsequent sub-frame offset by two from the given sub-frame, coordinating at the first and second base stations additional scheduling of transmission of (i) an additional at least one downlink RB from the first base station to at least one UE that is reporting to the first base station a SINR below the threshold SINR, and (ii) an additional at least one downlink RB from the second base station to at least one UE that is reporting to the second base station a SINR below the threshold SINR;

for both the additionally scheduled at least one downlink RB from the first base station and the additionally scheduled at least one downlink RB from the second base station, selecting the particular TM;

for both the additionally scheduled at least one downlink RB from the first base station and the additionally scheduled at least one downlink RB from the second base station, making a determination that no condition exists that requires transmission of the particular type of downlink reference signal; and during synchronous transmission in the subsequent sub-frame of both the additionally scheduled at least one downlink RB from the first base station and the additionally scheduled at least one downlink RB from the second base station, muting transmission of the particular type of downlink reference signal in any of the TFEs of the additional at least one downlink RB from the first base station and any of the TFEs of the additional at least one downlink RB from the second base station.

19. The wireless communication network of claim 17, wherein the wireless communication system is configured to operate according at least to LTE, wherein the particular TM is one of TM7 through TM10, wherein each of the downlink RBs comprises resource elements (REs) arrayed in consecutive symbol times spanning each given sub-frame and each given contiguous grouping of sub-carrier frequencies, wherein each TFE is a RE, wherein the particular type of downlink reference signal is a Cell-specific Reference Signal (CRS), scheduled by default for transmission on respective specific REs of each downlink RB, and wherein muting transmission of the particular type of downlink reference signal in any of the REs of the at least one downlink RB from the first base station and any of the REs of the at least one downlink RB from the second base station comprises:

transmitting each of the at least one downlink RB from the first base station and each of the at least one downlink RB from the second base station using one of TM7 through TM10; and omitting default transmission of the CRS in any of the REs of the at least one downlink RB from the first base station and any of the REs of the at least one downlink RB from the second base station during the transmitting.

20. The wireless communication network of claim 19, wherein making the determination that no condition exists that requires transmission of the particular type of downlink reference signal comprises determining for any given downlink RB that is one of the at least one downlink RB from the first base station or one of the at least one downlink RB from the second base station that none of a list of conditions holds, the list being:

(i) the given downlink RB being one of a particular group RBs that, because they are allocated sub-carrier frequencies in a central portion of the carrier band, are required to carry default CRS transmissions;

(ii) the given sub-frame being a System Information Block (SIB) sub-frame;

(iii) the given sub-frame being a Paging sub-frame; and (iv) the given sub-frame occurring during a connection set-up.

* * * * *